US005417939A

United States Patent [19]

Bunschoten et al.

[11] Patent Number: 5,417,939

[45] Date of Patent: May 23, 1995

[54] DETERGENT DISPENSING SYSTEM

[75] Inventors: Gerrit K. Bunschoten, Oud Zuilen; Lambertus G. Van Der Heyden, Bunnik, both of Netherlands

[73] Assignee: Lever Brothers Company, Division of Conopco, Inc., New York, N.Y.

[21] Appl. No.: 101,155

[22] Filed: Aug. 2, 1993

[30] Foreign Application Priority Data

Aug. 3, 1992 [EP] European Pat. Off. .......... 92202402

[51] Int. Cl.[6] .............................................. B01D 3/12

[52] U.S. Cl. ................................. 422/264; 141/346; 422/263

[58] Field of Search ............... 422/263, 264, 346, 351, 422/353, 354

[56] References Cited

U.S. PATENT DOCUMENTS

| | | | |
|---|---|---|---|
| 3,971,493 | 7/1976 | Williams | 141/351 |
| 4,426,362 | 1/1984 | Copeland et al. . | |
| 4,569,781 | 2/1986 | Fernholz et al. . | |
| 4,752,807 | 6/1988 | Mort | 141/346 |
| 4,774,014 | 9/1988 | Kuenzel et al. . | |
| 4,790,981 | 12/1988 | Mayer et al. | 422/263 |
| 5,029,624 | 7/1991 | McCunn et al. | 141/351 |
| 5,060,701 | 10/1991 | McCunn et al. | 141/351 |
| 5,089,854 | 2/1992 | Kaieda et al. | 141/346 |
| 5,132,740 | 7/1992 | Okamoto et al. | 141/351 |
| 5,198,198 | 3/1993 | Gladfelter et al. | 427/264 |
| 5,297,703 | 3/1994 | Tsao et al. | 141/351 |

FOREIGN PATENT DOCUMENTS

| | | |
|---|---|---|
| 462624 | 12/1991 | European Pat. Off. . |
| 533238 | 3/1993 | European Pat. Off. . |

OTHER PUBLICATIONS

Copending applications: Bunschoten, Ser No. 07/260,144, filed Oct. 20, 1990; Bunschoten, Ser. No. 07/744,553, filed Aug. 13, 1991; Bunschoten, Ser. No. 07/824,479, filed Jan. 17, 1992; Bunschoten, Ser. No. 08/120,091, filed Sep. 10, 1993.

*Primary Examiner*—Timothy M. McMahon
*Attorney, Agent, or Firm*—A. Kate Huffman

[57] ABSTRACT

A dispensing system is provided comprising a detergent supply pack (1) for supplying solid state detergent material to a dispensing device (4) associated with a washing machine and said dispensing device, which supply pack comprises packaging material for said solid state detergent material, said solid state detergent material and a closing/release device for promoting release of the detergent solid from the supply pack into the dispensing device, whereby the closing/release device comprises two movable parts (3*a*,3*b*) in between which the packaging material is clamped and which, after closing, are blocked by locking studs, such that the locking studs can be released by placing the supply pack on a top centring frame of the dispensing device which is used as a key for opening the movable parts and introducing the solid detergent into the dispensing device.

There are also provided a detergent supply pack and a dispensing device which are adapted for use in a dispensing system according to the invention.

7 Claims, 7 Drawing Sheets

DETERGENT DISPENSING SYSTEM

FIELD OF THE INVENTION

This invention relates to a dispensing system to be used for solid detergent products for institutional washing machines. The invention also relates to a detergent supply pack and a dispensing device, which are adapted for use in a dispensing system according to the invention. Furthermore, the invention relates to a method of dispensing a solid detergent product into the wash liquor to be fed to a washing machine.

PRIOR ART AND BACKGROUND OF THE INVENTION

Hitherto, various products and packs have been developed to provide institutional washing machines, especially dishwashing machines, with a supply of detergent material from which measured amounts of detergent product are dispensed to the wash liquor in the washing machine. These products include detergent products in powder form, in liquid form and in paste form, which are generally packed in supply packs or containers. More recently, solid detergent blocks for institutional washing machines have been developed, which have the advantage of being discretely shaped. Furthermore, solid detergent blocks can contain more concentrated product than the other above-mentioned product types. These block form detergent products are generally dissolved by simply spraying with water in a dispensing device, and then are delivered to the wash liquor. Since detergent products which are suitable for use in institutional washing machines, often have a high alkali content, contact with the skin should be avoided. Block form detergent products appear to be very suitable for avoiding skin contact.

U.S. Pat. No. 4,569,781 (Ecolab) describes a detergent container for a cast detergent solid suitable for use in dishwashing machines. The container contains a detergent product produced from a melt and allowed to solidify. The detergent product is subsequently dissolved from the container on contact with a stream of aqueous liquid from a spray means when placed in a dispensing device. The advantage of a block form detergent product and dispensing device of this type is that, with proper handling, contact with the skin is virtually eliminated. Owing to the shape thereof, however, the container described in this patent has shown to leave residues of detergent after emptying by spraying. This situation is unacceptable for economic, safety and environmental reasons. Detergent residues in the container are a potential danger source to the user when a supposedly empty container is being replaced by a completely full container. Moreover, from an environmental point of view such a rigid container is less attractive because of its impact to the environment and non-collapsibility.

U.S. Pat. No. 4,426,362 (Ecolab) describes a dishwasher distributor for a solid block form moulded detergent product. The block form detergent product of this reference is positioned with its casting mould in the receiving means of the distributor so that the casting mould surrounds the detergent block during the flushing out process and touches it on all sides except for one free face. Once again, contactless handling of the detergent product is provided, but once again, complete emptying is not guaranteed.

U.S. Pat. No. 4,774,014 (Henkel) discloses a detergent supply pack for a cast detergent block which pack is suitable for ready dissolution of the block in the dispensing device associated with an institutional dishwashing machine, such that water consumption is not appreciably higher than in the case of powder-form detergents, even towards the end of the block. However, the detergent supply pack has to be opened before positioning the pack in the dispensing device and therefore skin contact with the alkaline detergent is possible.

It is an object of the present invention to provide a detergent dispensing system comprising a detergent supply pack for a detergent powder or, preferably, a block form detergent product and a dispensing device associated with an institutional washing machine, preferably a dishwashing machine, whereby the supply pack ensures an economic and effective use of the detergent in the dispensing device. It is an other object of the invention to provide a detergent dispensing system whereby the detergent supply pack is adapted to the dispensing device such that the detergent can be introduced into the device without the need to open the pack before positioning the pack in the dispensing device and loading the device. This eliminates the risk of any skin contact and thus contributes to safety. It is a further object of the invention that no residue is left inside the supply pack after emptying and that a minimal amount of packaging material is to be disposed of after introducing the detergent product into the dispensing device.

In European patent application 533,238, a dispensing system comprising a dispensing device and a supply pack for supplying solid state, preferably block, detergent material to the dispensing device is described.

In this system, the supply pack comprises packaging material for solid state detergent material, said solid state detergent material and a closing/release device for promoting release of the solid detergent from the supply pack into the dispensing device, whereby the closing/release device essentially consists of two parts in between which the packaging material is fixed and is adapted to the dispensing device such that the closing-/release device can be easily removed in conjunction with the dispensing device for introducing the detergent solid into the dispensing device.

Preferably, the supply pack contains a compacted solid detergent block and comprises packaging material which conforms to the shape of the block.

The above-described dispensing system has the advantage that it is fairly easy to construct and ensures effective use of the solid detergent material. However, we also found that it requires a considerable number of handling steps and that consequently a realistic risk of mal-operation exists resulting in unsafe conditions. It is, therefore, an additional object of the present invention to provide a detergent dispensing system which is user-friendly and requires a limited number of handling steps.

It was found that these and other objects can be accomplished by a detergent dispensing system according to the present invention.

DEFINITION OF THE INVENTION

The present invention provides a dispensing system comprising a detergent supply pack (1) for supplying solid state detergent material to a dispensing device (4) associated with a washing machine and said dispensing device, which supply pack comprises packaging material for said solid state detergent material, said solid state detergent material and a closing/release device for promoting release of the detergent solid from the supply pack into the dispensing device, whereby the closing/release device comprises at least two movable parts in between which the packaging material is clamped and which, after closing, are blocked by locking studs, such that the locking studs can be released by placing the supply pack on a top centring frame (10) of the dispensing device which is used as a key for opening the movable parts and introducing the detergent solid into the dispensing device.

The invention also provides a detergent supply pack and a dispensing device which are adapted for use in a dispensing system according to the present invention. Furthermore, the invention provides a method of dispensing a solid detergent product into the wash liquor to be fed to a washing machine, whereby a dispensing system according to the invention is applied.

DETAILED DESCRIPTION OF THE INVENTION

The invention provides a dispensing system comprising a supply pack for a solid state detergent product, which may contain detergent powder, detergent briquettes and/or detergent tablets. However, the supply pack preferably contains a compacted detergent block, which is readily dissolvable on contact with flushing water.

The supply pack includes flexible packaging material which functions as a protective means against moisture uptake and also as a handling aid for the introduction of the naked detergent block into the detergent dispensing device of a washing machine, preferably a dishwashing machine, without contact with the skin. The packaging material is generally also collapsible in order to minimize the volume of packaging material to be disposed of after emptying the supply pack. As packaging material, any material which can perform the above mentioned functions, may be used, such as cardboard, coated paper, and laminated material (e.g. aluminium film), but plastic material such as polyethylene and polypropylene is preferred. The most preferred type of packaging material is polypropylene or polyester laminate with barrier coating, said coating preferably consisting of silicium oxide.

If a solid detergent block is applied, the supply pack of the invention thus comprises flexible packaging material which conforms to the shape of the detergent solid, a solid detergent block which is usually produced by compaction of dry mixed powder, and release means for releasing the solid detergent product from the supply pack into the dispensing device.

Generally, solid detergent blocks constitute a non-dusty and therefore attractive product form in view of the often aggressive chemicals used. Furthermore, they are economical in use because they can be manufactured and transported as very concentrated products. In EP-A-375,022 (Unilever) information can be found with respect to the type of solid detergent block which is preferably used with the supply pack according to the present invention.

In order to eliminate skin contact, the supply pack of the invention comprises a closing/release device essentially consisting of locking studs and at least two movable parts in between which the flexible packaging material of the pack is clamped. In other words, these movable parts act as a sort of closing clamp for the detergent supply pack. Preferably, these parts comprise two doors which can be snapped together to close the supply pack and which are kept in a closed position by at least two locking studs. When the locking studs are released the two doors are turnable over at most 90° from a horizontal closed position into a vertical fully open position. The locking studs are released when positioning the supply-pack on the top frame of the dispenser, by the weight of the supply pack and the application of some additional handforce. It is noted that the top frame acts as a type of key for releasing the locking studs.

As a result, the locking studs will turn inward into the hollow space of the frame and do not any longer support/lock the turnable doors which will open by the weight of the detergent block and the handforce applied by an operator. The connection between the turnable doors and the frame is preferably such (e.g. containing a lever or spring element) that the doors are returned into an approximately horizontal position after releasing the detergent block into the dispensing device. The reason is that as a result the risk of skin contact with the alkaline internals of the supply pack, is further reduced.

Furthermore, the dispensing system according to the invention comprises a dispensing device of which the dimensions are such that solid detergent material, preferably a solid detergent block, can be effectively and safely introduced into it from out of a detergent supply pack according to the present invention. If a solid detergent block is to be applied, the supply pack containing the detergent block is placed on a top centring frame of the dispensing device to facilitate the introduction of the detergent block into the dispensing device when opening the supply pack by release of the support studs. Thereafter, the naked detergent block is allowed to fall down onto a grid-type support in the bottom part of the dispensing device which support is preferably provided with a flexible sealing, such that only the bottom side of the block is contacted with water originating from a spray nozzle situated underneath this support. By contacting only the bottom part of the detergent block, excessive degradation of moisture-sensitive components present in the block is avoided.

This configuration is advantageous as the distance between the bottom side of detergent block and the spray nozzle will not vary during the washing operation resulting in a constant dissolution rate of detergent material and consequently a constant concentration of detergent product in the wash liquor fed into the washing machine.

In order to ensure that the dispensing device cannot be opened just after adding fresh solid detergent material, it is desirable that the device can only be opened after the detergent solid inside the device has decreased to below a certain level. For ensuring a continuous operation of the dispensing device, an indicator or alarm is preferably provided signalling that the device can be opened and a new detergent solid introduced.

BRIEF DESCRIPTION OF THE DRAWINGS

The invention is further illustrated by FIGS. 1–7, of which.

Figure 1:
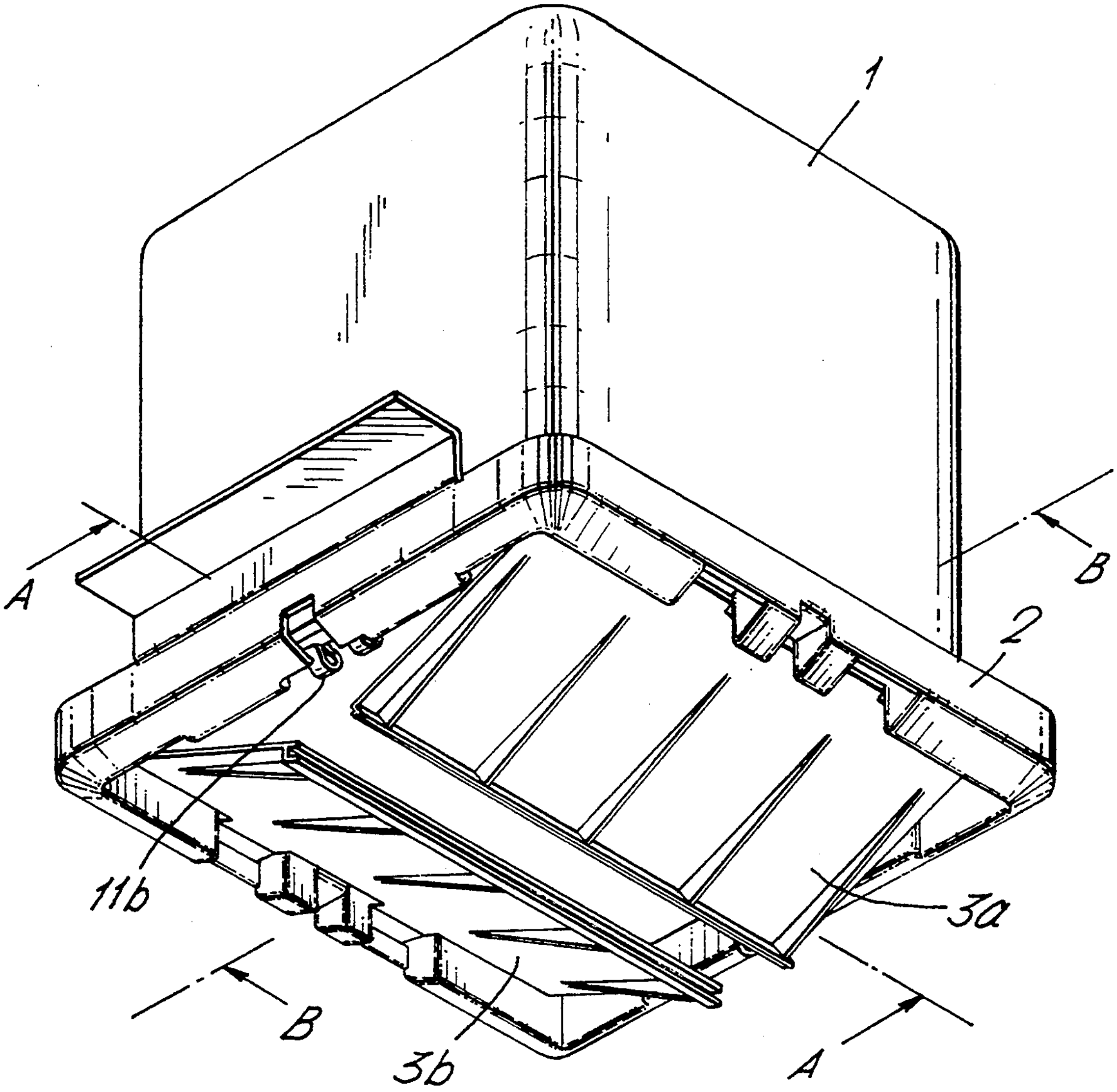
FIG. 1 gives an illustration of a detergent supply pack according to the invention.
Figure 2A:
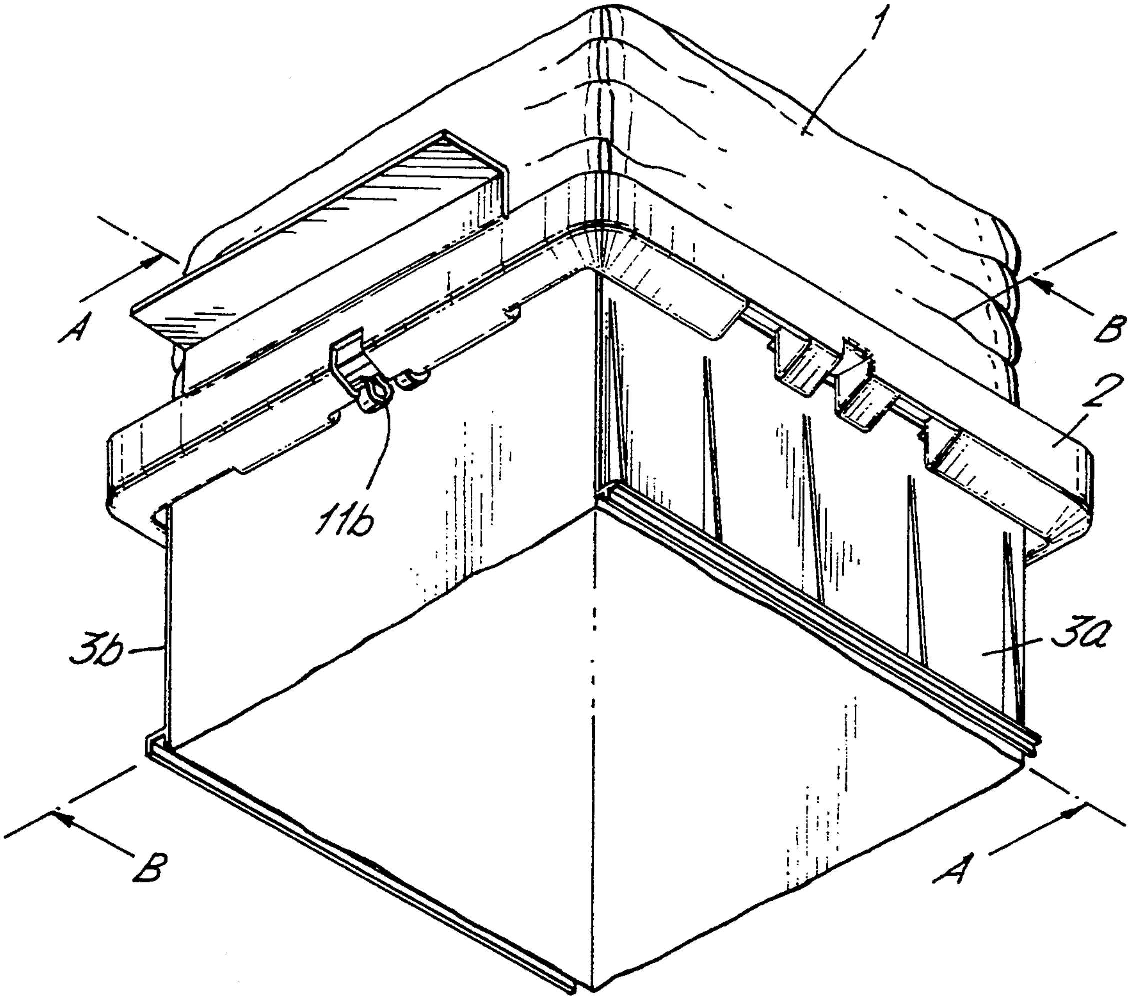
FIG. 2 gives perspective views of a closing device according to the invention, in the open (A) and closed (B) position.

Referring more in detail to these drawings, in FIG. 1 (1) indicates a detergent supply pack comprising flexible packaging material and a closing/release device (2). Also two movable rigid plastic doors (3*a*) and (3*b*) are shown in the half-open position. When these doors are fully opened as depicted in FIG. 2A, a solid detergent block can be introduced from out of the supply pack into a dispensing device.

Figure 2B:
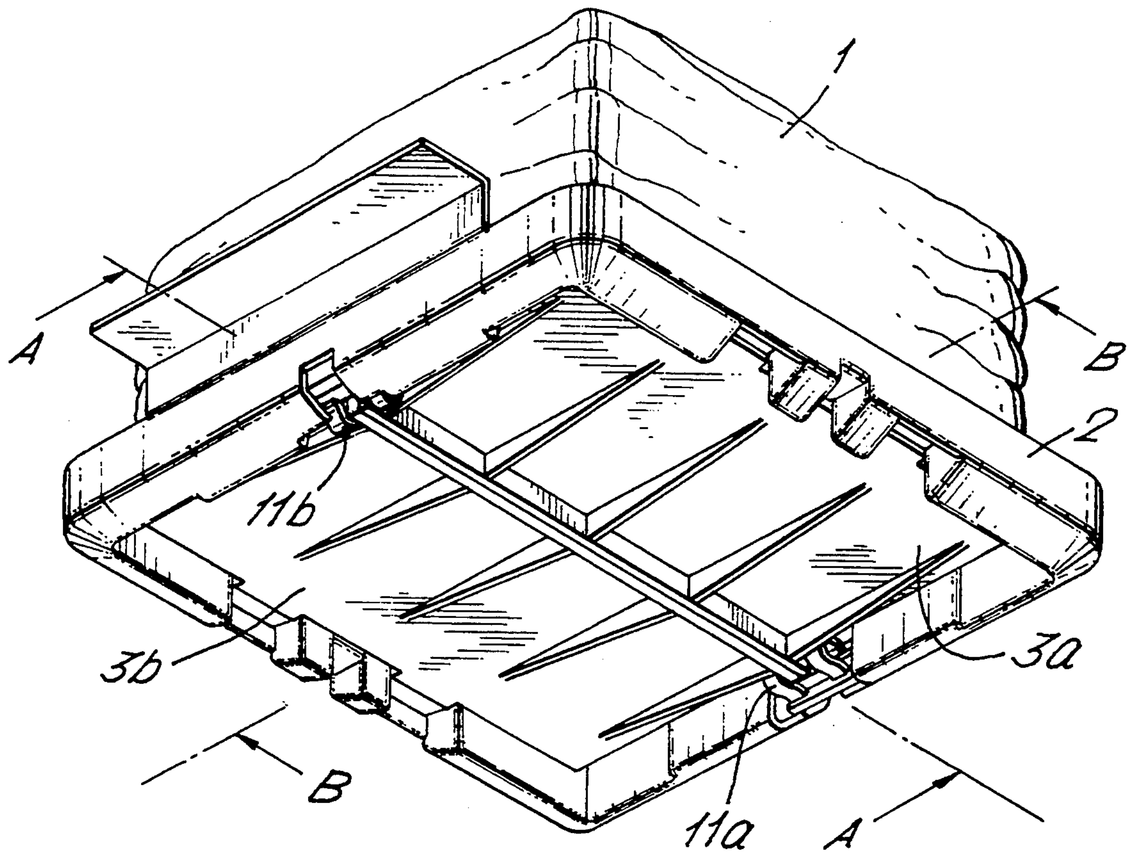

FIG. 2B shows the closing device in the closed position, whereby the doors have been snapped together and are kept in a horizontal closed position by two locking studs (indicated by elements (11*a*) and (11*b*)) and whereby the packaging material is clamped in between the doors.

Figure 3:
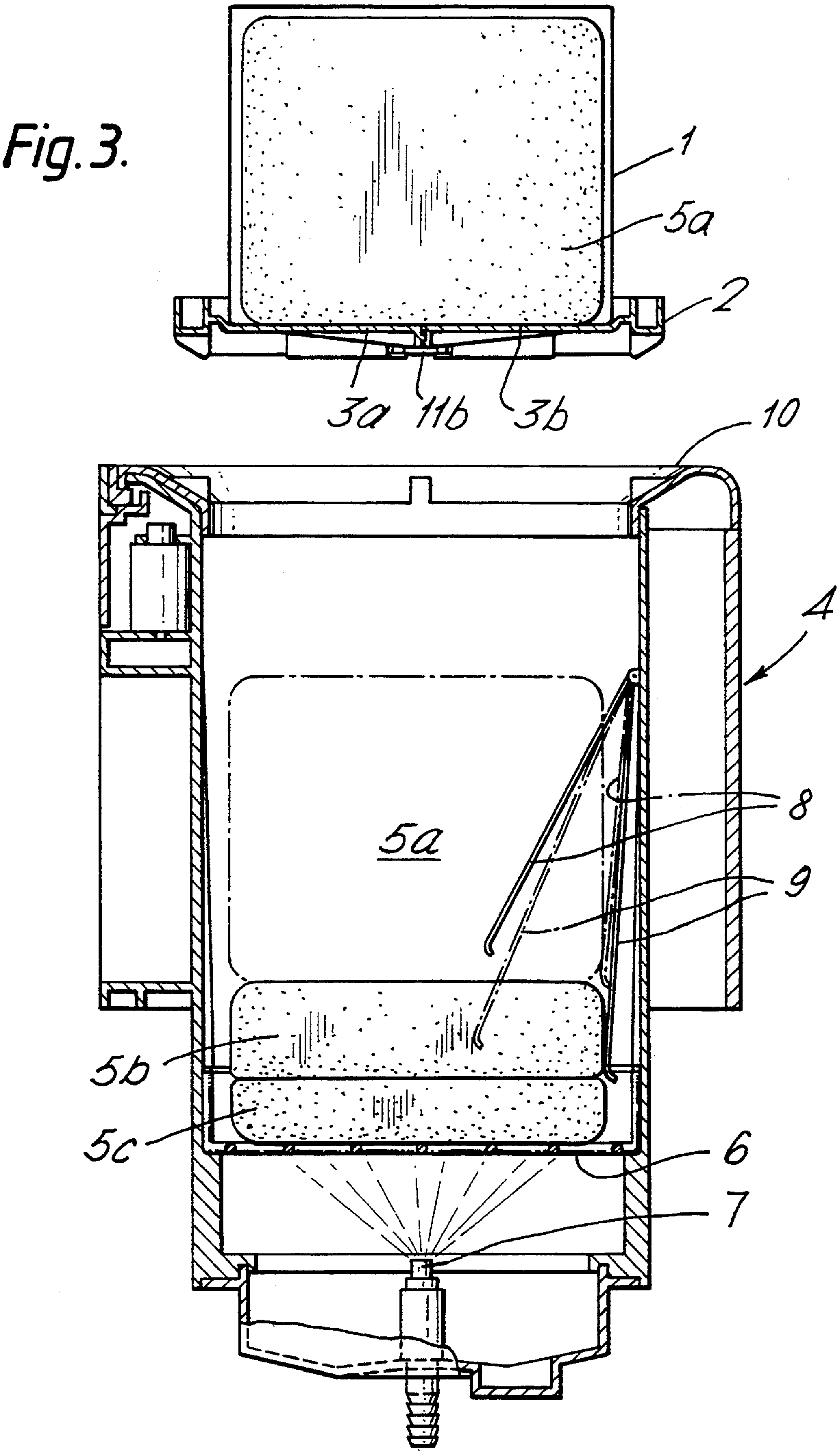
FIG. 3 shows a cross-sectional view of a solid block containing dispensing device and supply pack according to the invention.

In FIG. 3, a dispensing device (4) according to the invention is shown wherein solid block detergent material (5) is positioned on a grid-type support (6) and being sprayed-on by way of spray-nozzle (7).

Furthermore two levers, a refill lever (8) and a low level lever (9), are shown in FIG. 3. When the detergent material inside the dispensing device (4) has been dissolved so far that only detergent material (5*b*) and detergent rest volume (5*c*) are left over, refill lever (8) turns back to its original position thereby causing the fixation of top lid closure to be released. Refill lever (8) may be connected to an indicator telling the operator that the contents of a new supply pack may be introduced into the dispensing device. For this purpose, refill lever (8) may also be connected to an alarm system which is activated when the fixation of the top lid closure is released. When the dispensing device is not refilled and the detergent material present therein has been dissolved sofar that only the detergent rest volume (5*c*) is left over, the low level lever (9) which is installed for safety reasons, turns back to its original position. As a result of this, a signal is given which can be used to trigger stopping the operation of the dispensing system.

On top of the dispensing device, a square-shaped top centring frame (10) is depicted which contains four release knobs located in the middle of each side of the top centring frame. These release knobs can cooperate with the two locking studs on the closing/release device for opening of the supply pack when it is placed on the top centring frame. The two locking studs are located in the middle of two opposite sides of the closing release device. As a consequence of the position of the four release knobs and the two locking studs, these two locking studs will always be able to cooperate with two of the four release knobs on the top centring frame for opening the movable doors (3*a*,3*b*), whatever be the position of the supply pack on the frame when centred thereon. In other words: there is no preferred position of the supply pack on the top centring frame (10).

In FIGS. 4–7, the cooperation of the closing/release device (2) and the top centring frame (10) is shown at consecutive stages when operating the dispensing system of the invention.

Figure 4A:
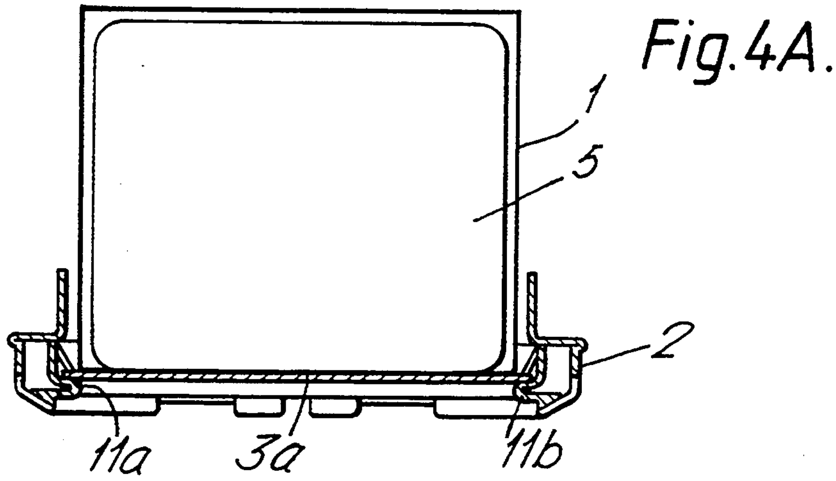
FIGS. 4*a*, 6*a* and 7*a* are cross-sectional views along the line A—A shown in FIG. 1, and FIGS. 4*b*, 5, 6*b* and 7*b* are cross-sectional views along the line B—B shown in FIG. 1.
Figure 4B:
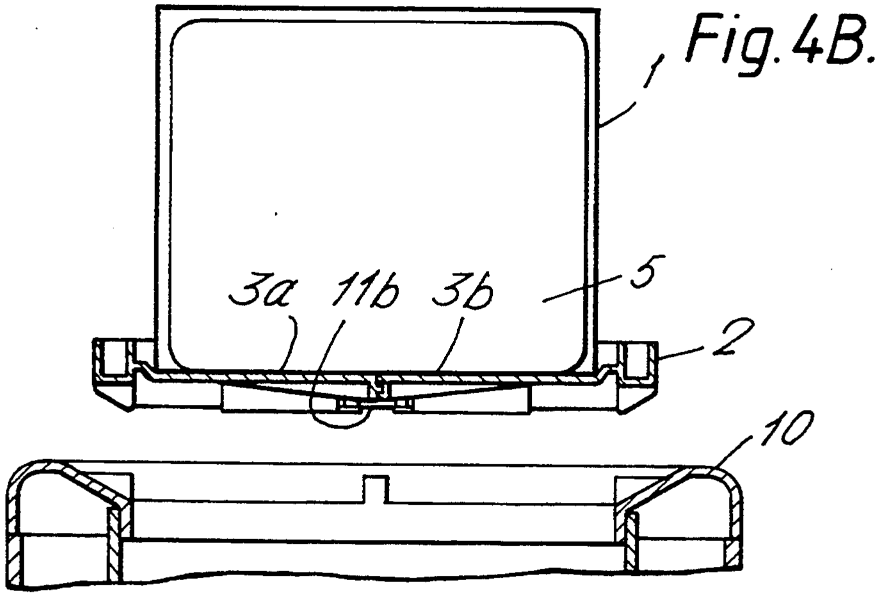
FIGS. 4–7 show schematic cross-sectional views of the dispensing system of the invention at consecutive stages when operating the system, whereby
Figure 5:
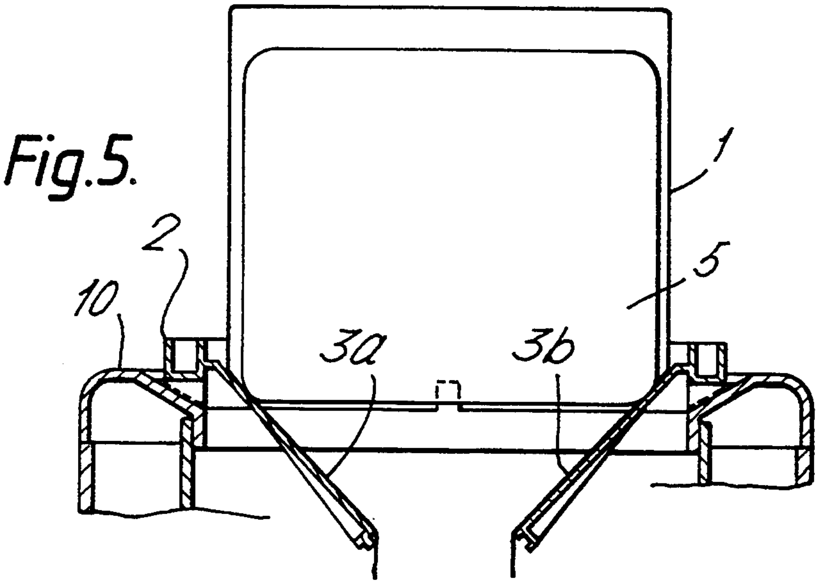
Figure 6A:
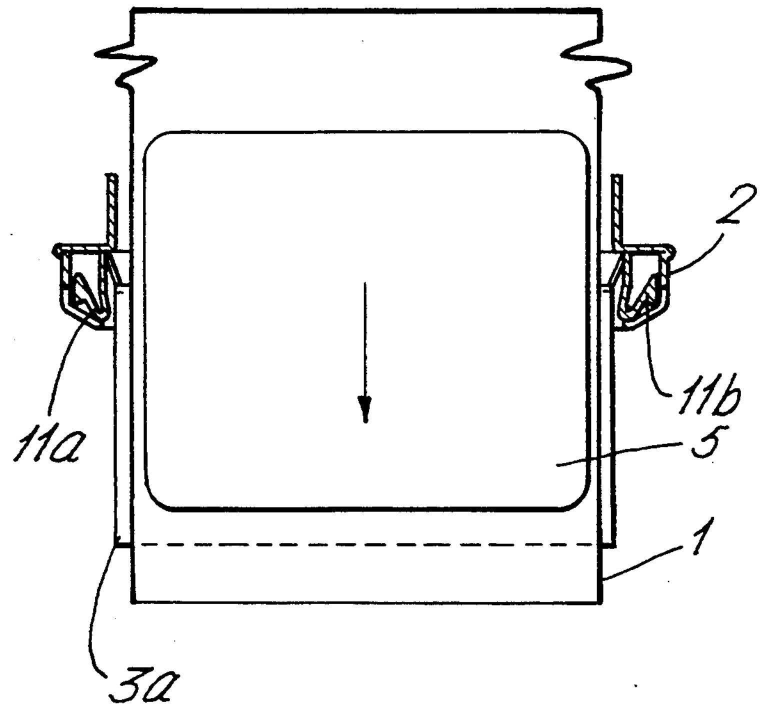
Figure 6B:
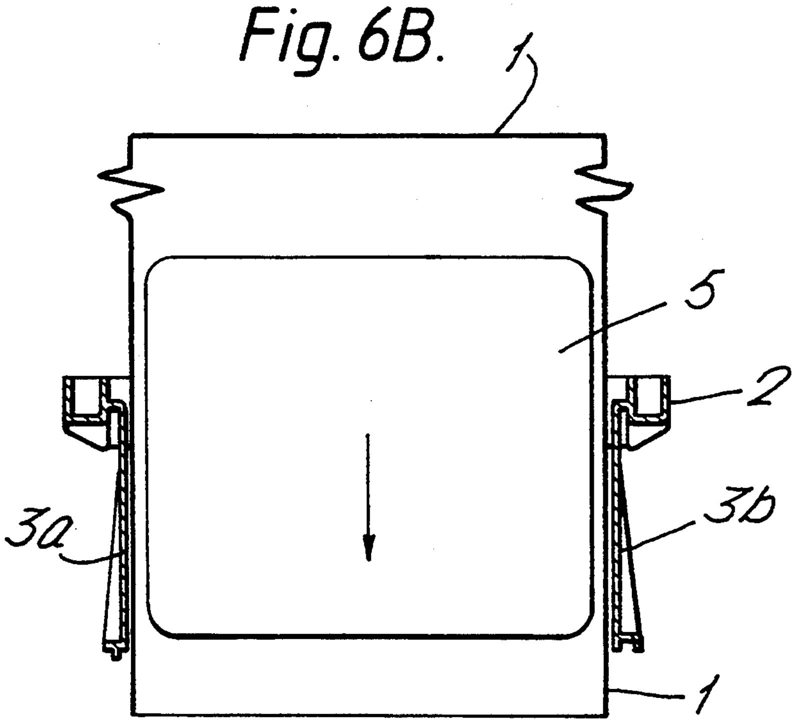
Figure 7A:
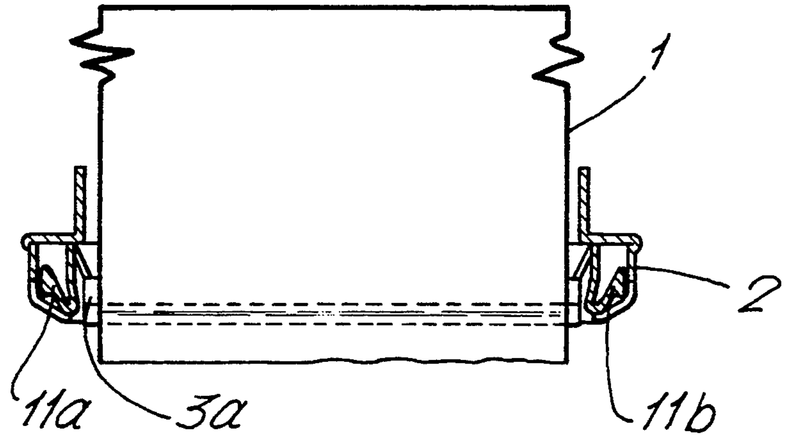
Figure 7B:
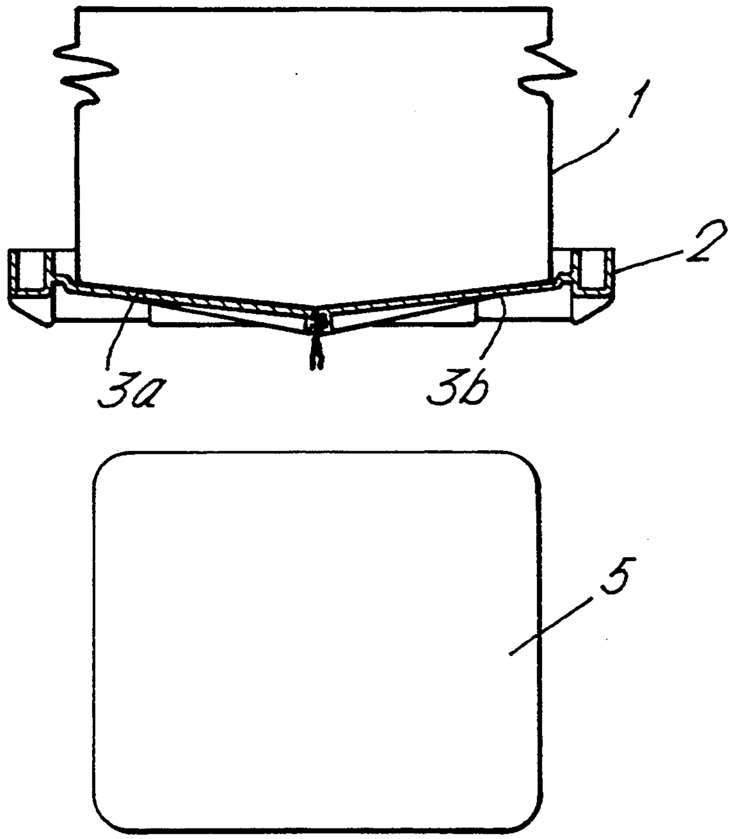

In FIG. 4, the first stage is depicted wherein the closing/release device of a closed supply pack is positioned on the top centring frame of a dispensing device, whereby two release knobs located on the centring frame are in line with the two locking studs on the closing/release device. The total weight of the supply pack now presses on to the two locking studs which are leaning against two of the four release knobs and which are connected with a frame-type element of the closing-/release device surrounding the closed doors (3*a*) and (3*b*), by means of a hinge. By the weight of the pack and some additional handforce these locking studs are pressed upward and, as a result they are no longer securing closure of the doors. These doors will open (see FIG. 5) and finally they are in a vertical position thus making the way free for the block to drop into the dispensing device (see FIG. 6). The doors of the closing device are spring-loaded. So, when the solid block has dropped into the dispensing device, they turn almost back into their original horizontal position by the action of the spring, thus reclosing the supply-pack for about 95% and avoiding skin contact with the usually alkaline and aggressive residual material in the inside of the emptied supply-pack.

We claim:

1. A dispensing system for delivering detergent into a washing machine, comprising: a detergent supply pack for supplying solid state detergent material to a dispensing device associated with the washing machine, and said dispensing device, the supply pack comprises packaging material for said solid state detergent material, the solid state detergent material packaged in said packaging material, and a closing/release device for controlling release of the solid detergent material from the supply pack into the dispensing device, wherein the closing/release device comprises at least two hingeable doors for securing the packaged detergent material within the supply pack and which, after closing, are locked closed by locking studs, and wherein the locking studs are releasable so as to permit opening of the hingeable doors and the solid detergent material to be introduced into the dispensing device by placement of the supply pack on a top centering frame of the dispensing device.

2. A dispensing system according to claim 1, wherein the closing/release device comprises two doors which are hingeable through an angle of at most 90° when the locking studs are released and the solid detergent material is introduced into the dispensing device.

3. A dispensing system according to claim 1, wherein the top centering frame of the dispensing device comprises release knobs and the locking studs are released by cooperation with said release knobs when placing the supply pack on the centering frame of the dispensing device.

4. A dispensing system according to claim 1, wherein the hingeable doors are springloaded and hinge back into a closed position after the solid detergent material has been introduced into the dispensing device.

5. A dispensing system according to claim 1, wherein the detergent material is in the form of a compacted detergent block and the packaging material conforms to the shape of the detergent block.

6. A dispensing system according to claim 1, wherein the dispensing device is provided with a grid-type support with a flexible seal in the bottom part thereof, on which support the solid detergent material is located after it is introduced into the dispensing device, and wherein a spraying nozzle is situated underneath the support and the flexible seal is located such that only the bottom part of the detergent material is contactable with water sprayed from the spraying nozzle.

7. A dispensing system according to claim 1, wherein the dispensing device includes a top lid closure and further comprises means for preventing opening of the lid closure until after the height of solid detergent material within the dispensing device has decreased to below a certain level whereby the dispensing device cannot be opened immediately after adding fresh solid detergent material.

* * * * *